United States Patent [19]

Tanaka et al.

[11] Patent Number: 4,759,076
[45] Date of Patent: Jul. 19, 1988

[54] IMAGE ROTATING SYSTEM BY AN ARBITRARY ANGLE

[75] Inventors: Atsushi Tanaka; Masatoshi Kameyama, both of Kamakura, Japan

[73] Assignee: Mitsubishi Denki Kabushiki Kaisha, Kanagawa, Japan

[21] Appl. No.: 945,574

[22] PCT Filed: Feb. 25, 1986

[86] PCT No.: PCT/JP86/00090
§ 371 Date: Nov. 19, 1986
§ 102(e) Date: Nov. 19, 1986

[87] PCT Pub. No.: WO86/05299
PCT Pub. Date: Sep. 12, 1986

[30] Foreign Application Priority Data
Feb. 28, 1985 [JP] Japan .................. 60-39813

[51] Int. Cl.⁴ ............................. G06K 9/32
[52] U.S. Cl. ..................... 382/46; 340/727;
358/22; 364/731
[58] Field of Search ............ 382/46; 358/22;
340/727; 364/731

[56] References Cited
U.S. PATENT DOCUMENTS
4,527,155 7/1985 Yamaki et al. ............. 340/727
4,618,991 10/1986 Tabata et al. ............... 382/46
4,622,588 11/1986 Chapuis et al. ............. 358/22

FOREIGN PATENT DOCUMENTS
3419063 11/1984 Fed. Rep. of Germany.
58-219663 12/1983 Japan .................. 382/46
58-188773 10/1984 Japan .................. 382/46
59-214969 12/1984 Japan .................. 382/46
60-97474 5/1985 Japan .................. 382/46

OTHER PUBLICATIONS
Casey et al., IBM Technical Disclosure Bulletin, vol. 13, No. 11, Apr. 1971, pp. 3267-3268.
"High Speed Image Scaling for Integrated Document Management", Tabata et al., Office Information System Conference, Jun. 1984, Toronto, Canada edited by Clarence A. Ellis, vol. 5, Nos. 1-2.

Primary Examiner—Leo H. Boudreau
Attorney, Agent, or Firm—Sughrue, Mion, Zinn, Macpeak & Seas

[57] ABSTRACT

A system for rotating an image by an arbitrary angle which is effective in image processing techniques using terminal equipment such as a work station, and will not distort a rotated image even with an increasing rotation angle $\theta$. Skew transformation is implemented for respective skew angles in horizontal and vertical directions corresponding to a desired rotation angle three times alternately, so that affine transformation for image rotation may be replaced by triple skew transformations. Thus, arbitrary two-dimensional image data is precisely rotated by any desired angle at high speeds without resorting to approximation of the arithmetic equation.

4 Claims, 4 Drawing Sheets

IMAGE ROTATING SYSTEM BY AN ARBITRARY ANGLE

FIELD OF ART

This invention relates to an image rotating system by an arbitrary angle for use in image processing techniques.

BACKGROUND OF ART

Heretofore, a system resorting to affine transformation has been usual in an attempt to rotate two-dimensional image data. Rotating an image through affine transformation requires arithmetic operations based on the following equation (1);

$$\begin{pmatrix} x \\ y \end{pmatrix} = \begin{pmatrix} \cos\theta & -\sin\theta \\ \sin\theta & \cos\theta \end{pmatrix} \begin{pmatrix} X \\ Y \end{pmatrix} \quad (1)$$

where X, Y are coordinates of the original pixel, x, y are coordinates after transformation and $\theta$ is an rotated angle of image data. When handling image data such as a displayed image, the above transformation requires to implementation of arithmetic operations of the equation (1) pixel-by-pixel. Thus, a large amount of computation is needed, particularly when rotating a large image and, therefore, it was considered very difficult to obtain a rotated image at high speeds.

Accordingly, as disclosed in Japanese Patent LaidOpen No. 55-94145(1980) by way of example, there has been proposed a system wherein an image is skewed to obtain a rotated image in a pseudo manner, i.e., that an image is first subjected to skew transformation by an angle $\theta$ in a horizontal direction and then another skew transformation by an angle $\theta$ in a vertical direction. Such a system resorting to skew transformation by an angle $\theta$ will be described with reference to FIG. 4. Referring to the figure, 400 is an original image, 401 is the image after skew transformation in a horizontal direction, and 402 is an image derived from 401, which was derived from the original image after the skew transformation in a horizontal direction, after another skew transformation in a vertical direction. These skew transformations can be achieved at high speeds by a suitable method such as skew scan. The skew transformation method can be described by the following equation (2):

$$\begin{pmatrix} x \\ y \end{pmatrix} = \begin{pmatrix} 1 & 0 \\ \tan\theta & 1 \end{pmatrix}\begin{pmatrix} 1 & -\tan\theta \\ 0 & 1 \end{pmatrix}\begin{pmatrix} X \\ Y \end{pmatrix} \quad (2)$$

$$= \begin{pmatrix} 1 & -\tan\theta \\ \tan\theta & 1-\tan^2\theta \end{pmatrix}\begin{pmatrix} X \\ Y \end{pmatrix} \simeq \begin{pmatrix} \cos\theta & -\sin\theta \\ \sin\theta & \cos\theta \end{pmatrix}\begin{pmatrix} X \\ Y \end{pmatrix}$$

where $\theta$; minute angle

Because the conventional image rotating system by an arbitrary angle was implemented as mentioned above, approximation of the equation (2) will lose its effectiveness and the rotated image will be distorted, as a rotation angle $\theta$ increases. As a result, the conventional system can be applied only while the rotation angle is within a range of certain minute angles.

SUMMARY OF THE INVENTION

One object of this invention is to provide an image rotating system by an arbitrary angle to produce a precise rotated image at high speeds without resorting to approximation of the arithmetic equation, the system being featured in that a skew transformation is implemented for respective skew angles in horizontal and vertical directions corresponding to a desired rotation angle three times alternately, so that affine transformation of an image requiring large amount of computation may be replaced by triple skew transformations, thereby rotating any twodimensional image data by a desired angle.

In accordance with the invention, since skew transformation is implemented for respective skew angles in X- and Y-directions corresponding to a desired rotation angle three times alternately, image rotation can be performed without needing arithmetic operations of affine transformation, at high speeds. The invention can also offer an effect that two-dimensional image data rotated by an arbitrary angle is obtainable more precisely than the conventional system which resorts to double skew transformations.

BEST MODE OF THE PRESENT INVENTION

Hereinafter, one embodiment of the invention will be described with reference to the drawings. It is to be noted that the description will be made for X-Y rectangular coordinates with the X-direction representing a horizontal direction and the Y-direction representing a vertical direction.

Figure 1:
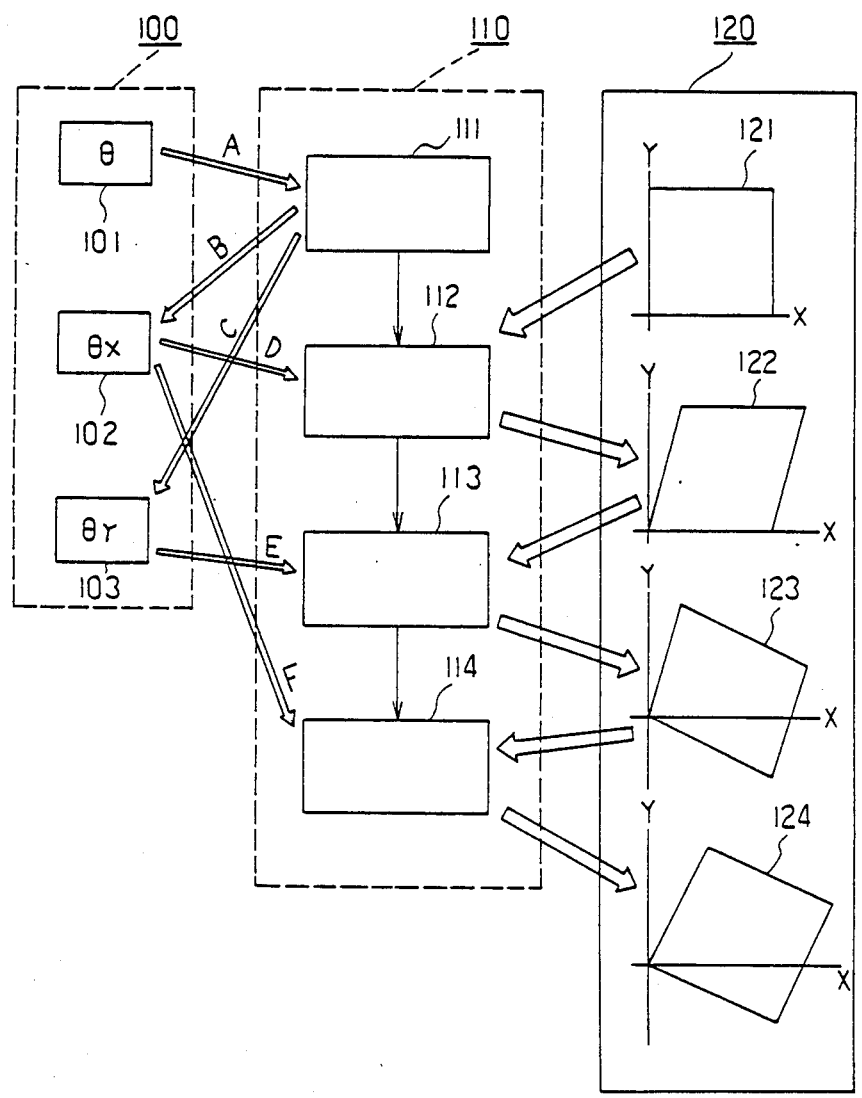
FIG. 1 is a diagram showing the procedure of skew transformations according to one embodiment of the invention.

Referring to FIG. 1 there is shown one embodiment the invention. 100 is a data unit, 110 is a processing unit composed of four processing blocks, and 120 is an image memory (hereinafter abbreviated to as IMM) for storing two-dimensional image data. Furthermore, designated at 101 is a rotation angle $\theta$ of the two-dimensional image data, 102 is a skew angle $\theta_x$ of the two-dimensional image data in the X-direction, 103 is a skew angle $\theta_Y$ of the two-dimensional image data in the Y-direction, 111 is a transformation angle determining section, 112 is a (first) X-axis skew transformation section (or a second Y-axis skew transformation section), 113 is a Y-axis skew transformation section (or a third X-axis skew transformation section), 114 is a (second) X-axis skew transformation section, 121 is (first) original two-dimensional image data, 122, 123 are (second and third) two-dimensional data (or fifth and sixth twodimensional data) gained during the process of image rotation, and 124 is (fourth) two-dimensional image data (or seventh two-dimensional image data) gained after image rotation.

Operation of the system will now be described.

First, when the image rotation angle $\theta$ 101 is given as indicated by arrow A, the skew angle $\theta_X$ 102 in the X-direction and the skew angle $\theta_Y$ in the Y-direction are both determined in the transformation angle determining section 111 as indicated by arrows B and C, respectively. Then, the X-axis skew transformation section 112 subjects the first two-dimensional image data 121, which is loaded in the IMM 120 as the original two-dimensional image data, to skew transformation in the X-direction for the given transformation angle $\theta_X$ 102 as indicated by arrow D, thereby producing the second two-dimensional image data 122 which is again written into the IMM 120. Subsequently, the Y-axis skew transformation section 113 subjects the second two-dimensional image data 122 to skew transformation in the Y-direction for the given transformation angle $\theta_Y$ as indicated by arrow E, thereby producing the third two-dimensional image data 123. After that, the X-axis skew transformation section 114 subjects the third two-dimensional image data 123 to skew transformation in the X-direction for the given transformation angle $\theta_X$ 102 as indicated by arrow F, thereby finally producing the two-dimensional image data 124 which was obtained by rotating the original two-dimensional data through the angles $\theta$.

There will now be described one embodiment of a method by which the transformation angle determining section 111 shown in FIG. 1 determines the skew angles of skew transformations in the X- and Y-directions corresponding to the given rotation angle. In accordance with the present system, skew transformations for the respective coordinate axes are implemented in the directions of X-, Y- and Y-axis, or Y-, X- and X-axis in this order. However, both schemes are essentially identical to each other, so only the former scheme will be described herein. As stated in connection with the equation (1), a transformation matrix adapted to implement the rotation processing is represented by:

$$\xi = \begin{pmatrix} \cos\theta & -\sin\theta \\ \sin\theta & \cos\theta \end{pmatrix} \quad (1)$$

This transformation matrix can be divided into the following three matrices.
Assuming $$\xi = \xi_1 \cdot \xi_2 \cdot \xi_3$$

$$\xi_1 = \xi_3 = \begin{pmatrix} 1 & -\tan\theta/2 \\ 0 & 1 \end{pmatrix}, \quad \xi_2 = \begin{pmatrix} 1 & 0 \\ \sin\theta & 1 \end{pmatrix} \quad (3)$$

where $\xi_1$, $\xi_3$ represent skew transformation in the X-direction, and $\xi_2$ represents skew transformation in the Y-direction. Accordingly, the transformation angle $\theta_X$ in the X-direction and the transformation angle $\theta_Y$ in the Y-direction both necessary for rotating the two-dimensional image by an angle $\theta$ are given by the equations (4) below:

$$\begin{cases} \theta_X = \theta/2 \\ \theta_Y = \tan^{-1}(\sin\theta) \end{cases} \quad (4)$$

It is thus possible to obtain a rotated image by implementing skew transformations in the directions of X-, Y- and X-axis in this order for the above respective angles.

Figure 2:
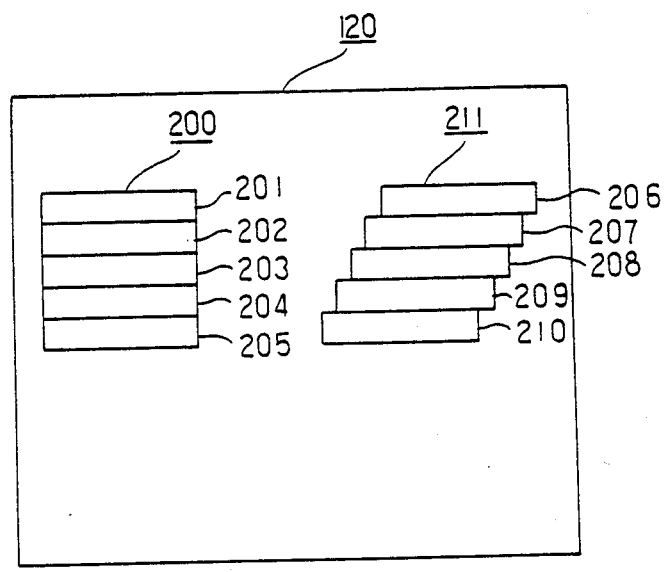
FIG. 2 is an illustration showing a two-dimensional image according to one embodiment of skew transformation in an X-direction.

There will now be described one embodiment of skew transformation in the X-direction, with reference to FIG. 2, which is to be implemented by the X-axis skew transformation section 112 shown in FIG. 1. In the figure, designated at 200 is an original two-dimensional image data stored in the IMM 120, 201–205 are two-dimensional image data resulting from dividing the original two-dimensional image data 200 into a plurality of blocks, 206–210 are two-dimensional image data resulting from transferring the divided two-dimensional image data 201–205, respectively, and 211 is two-dimensional image data resulting from transformation and which consists of the transferred two-dimensional image data 206–210.

First, the original two-dimensional image data 200 is divided into plural blocks of the two-dimensional image data 201–205, each block including several rows in accordance with the angle of skew transformation. Practically, when the transformation angle is assumed to be $\theta_X$, the number of rows included in each block is given by 1/tan $\theta_X$. After that, the divided two-dimensional image data are transferred sequentially. The block of two-dimensional image data 201 is first transferred to a position of the block of two-dimensional image data 206 corresponding to another area within the IMM 120. The block of two-dimensional image data 202 is then transferred to a position of the block of two-dimensional image data 207 which is shifted from the block 206 by one dot. In this respect, when the image data in the IMM 120 is accessed on a word-by-word basis, bit shift, masking or any appropriate operation is made during transfer of the image data, to thereby shift the transferred data by one dot from one another. The above process will be repeated until the block of two-dimensional image data 205 for each of the divided blocks, so that those blocks of two-dimensional image data are transferred to their respective positions shifted from one another by one dot. Skew transformation is thus implemented throughout the original two-dimensional image data 200, resulting in two-dimensional image data whose entire image has been skewed as represented by the two-dimensional image data 211.

Skew transformation in the X-direction to be implemented by the X-axis skew transformation section 114 shown in FIG. 1 can be achieved in the same manner as the above.

Further, skew transformation in the Y-direction to be implemented by the Y-axis skew transformation section 113 can be achieved by applying the above process to the vertical direction, so the description thereof will be omitted.

Figure 3:
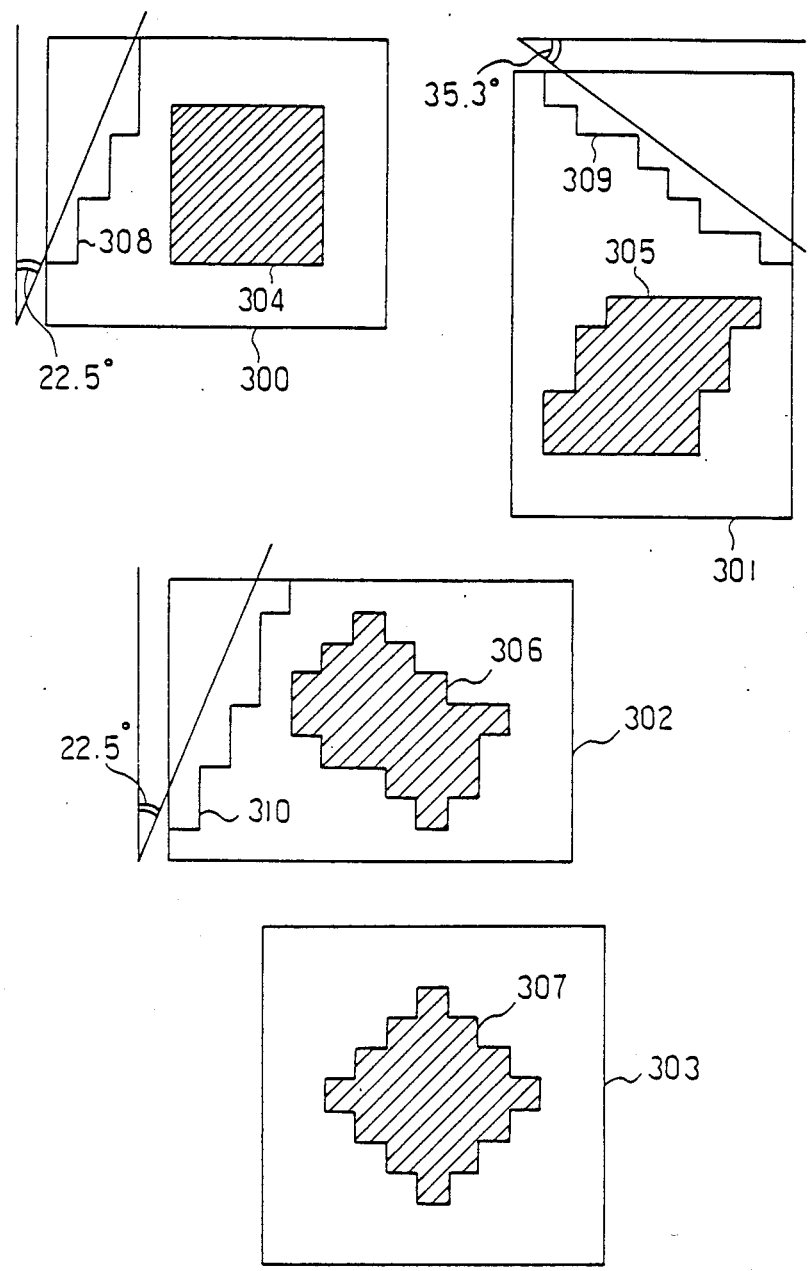
FIG. 3 is a diagram showing the process of image rotation according to one embodiment of the invention.
Figure 4:
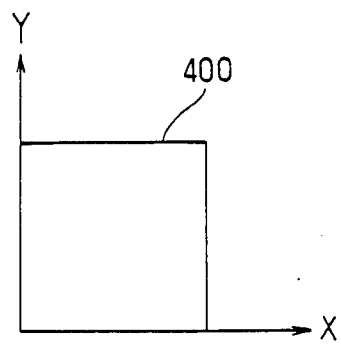
FIG. 4 is a diagram for explaining a conventional image rotating system by an arbitrary angle.
Figure 4:
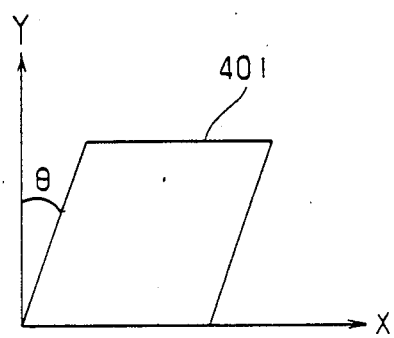
Figure 4:
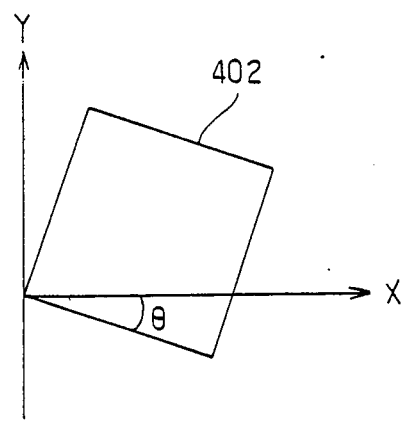

Next, FIG. 3 illustrates the transformation process of practical rotation of two-dimensional image data according to the invention, for a rotation angle of 45° by way of example. The number of picture elements is assumed to be given by 5×5 pixels for convenience of the description. In the figure, 300 is a first image storage area within the IMM 120, 301 is a second image storage area within the IMM 120, 302 is a third image storage area within the IMM 120, 303 is a fourth image storage area within the IMM 120, 304 is original two-dimensional image data, 305, 306 are two-dimensional image data gained during the process of rotation, 307 is two-dimensional image data gained after rotation, and 308–310 are digital skew angles each of which indicates a gradient corresponding to the transformation angle of skew transformation in a digital fashion.

Operation of such skew transformation will now be described. First, the skew angles in the X- and Y-directions are determined to be 22.5° and 35.3° from the rotation angle of 45°, respectively, based on the equations (4). First skew transformation in the X-direction for 22.5° is implemented in accordance with the method described in connection with FIG. 2. Specifically, the image data is shifted one dot-by-one dot in a stepwise manner as indicated by the digital skew angle 308 in FIG. 3. The original two-dimensional image data 304 is thus transformed to the two-dimensional image data skewed at the skew angle of 22.5°. After that, the two-dimensional image data 305 during the process of rotation is shifted one dot-by-one dot in the vertical direction in a stepwise manner as indicated by the digital skew angle 309, so that Y-axis skew transformation is implemented for the skew angle of 35.3° to obtain the two-dimensional image data 306 during the process of rotation. Subsequently, using a similar operation, the above two-dimensional image data 306 subjected to skew transformation in the X-direction for 22.5°, thereby obtaining the objective two-dimensional image data 307 which resulted from rotating the original two-dimensional image data 304 by 45°.

INDUSTRIAL APPLICABILITY

This invention is not only available in a workstation for use in offices, etc., but also applicable to terminal equipment in an office automation system, such as personal computers.

We claim:

1. A system for rotating an image by an arbitrary angle, comprising:

an image memory for storing two-dimensional image data;

a transformation angle determining section for determining both a first skew angle in a first direction and a second skew angle in a second, different direction for original two-dimensional image data stored in said image memory, in accordance with a desired rotation angle;

a first skew transformation section for obtaining second two-dimensional image data which is derived from skewing said original two-dimensional image data in said first direction by said first skew angle;

a second skew transformation section for obtaining third two-dimensional image data which is derived from skewing said second two-dimensional image data in said second direction by said second skew angle; and a third skew transformation section for obtaining fourth two-dimensional image data which is derived from skewing said third two-dimensional image data in said first direction once again by said first skew angle.

2. An image rotating system according to claim 1, wherein said desired rotation angle is $\theta$, said first skew angle is $\theta/2$ and said second skew angle is $\tan^{-1}(\sin\theta)$.

3. An image rotating system according to claim 2, wherein said first direction is a horizontal direction and said second direction is a vertical direction.

4. An image rotating system according to claim 2, wherein said first direction is a vertical direction and said second direction is a horizontal direction.

* * * * *